United States Patent
Beregi et al.

[11] 3,725,432
[45] Apr. 3, 1973

[54] BIPHENYLYL PYRAZOLE COMPOUNDS

[75] Inventors: Laszlo Beregi, Boulogne S/Seine; Pierre Hugon, Rueil-Malmaison; Jean-Claude Le Douarec, Suresnes, all of France

[73] Assignee: Societe en Nom Collectif Science Union et Cie, Societe Francaise Medicale, Suresnes, France

[22] Filed: June 28, 1971

[21] Appl. No.: 157,727

[30] Foreign Application Priority Data

July 13, 1970 Great Britain.....................33,824/70

[52] U.S. Cl. ..........260/310 R, 260/544 M, 424/273
[51] Int. Cl. ...........................................C07d 49/18
[58] Field of Search ...................................260/310 R

[56] References Cited

OTHER PUBLICATIONS

Matsoyan et al. Chem. Abst. Vol. 72, No. 90362h (1970). QD1.A51

Reid et al. Chem. Abst. Vol. 53, column 1314 (1959) QD1.A51

*Primary Examiner*—Natalie Trousof
*Attorney*—Gordon W. Hueschen et al.

[57] ABSTRACT

Pyrazole compounds of the formula

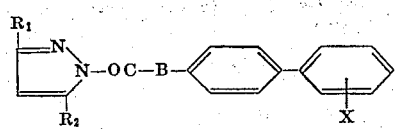

wherein $R_1$ and $R_2$ are hydrogen, methyl or ethyl, B is

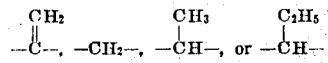

and X is hydrogen or halogen.

These compounds possess analgesic and anti-inflammatory properties.

4 Claims, No Drawings

BIPHENYLYL PYRAZOLE COMPOUNDS

The present invention provides pyrazole compounds of the general formula I:

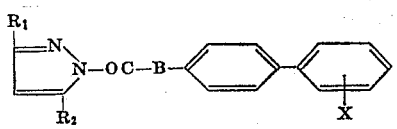

wherein:
$R_1$ and $R_2$, which are the same or different are selected from the group consisting of a hydrogen atom, a methyl radical and an ethyl radical;
B is selected from the group consisting of a

radical, a — $CH_2$ — radical, a

radical, and a

radical, and
X is selected from the group consisting of a hydrogen atom and a halogen atom, for example as a fluorine, chlorine or bromine atom.

The pyrazole compounds of the present invention are prepared by reacting the appropriate biphenylyl alkanoyl or alkenoyl chloride of the general formula II:

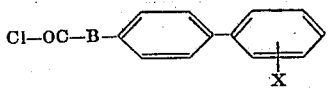

wherein B and X have the meanings given above, with a pyrazole of the general formula III:

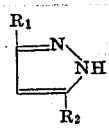

wherein $R_1$ and $R_2$ have the meanings given above.

The following examples illustrate the invention. All parts were given by weight and the melting points were determined by the Kofler method.

EXAMPLE 1

1-(biphenyl-4-yl-acetyl)-3,5-dimethyl-pyrazole

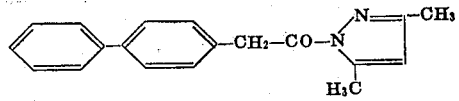

To a solution of 23.9 parts of 3,5-dimethyl-pyrazole in 500 parts of anhydrous ether there were added, in the course of 30 minutes with stirring, 28.7 parts of biphenyl-4-yl-acetyl chloride in 500 parts of anhydrous ether.

The reaction mixture was refluxed for 1 hour, then cooled and the precipitated 3,5-dimethylpyrazole hydrochloride was filtered off. The filtrate was evaporated in vacuo and the residue was crystallized from 80 parts of anhydrous ethanol.

There were obtained 27.5 parts of 1-(biphenyl-4-yl-acetyl)-3,5-dimethylpyrazole, melting at 64°–66° C.

EXAMPLES 2–9

The following compounds were prepared by the method of Example 1.

2. 1-[α-(biphenyl-4-yl)-propionyl]-3,5-dimethyl-pyrazole, M.P. 73° C (petroleum-ether), starting from biphenyl-4-yl-propionyl chloride and 3,5-dimethyl-pyrazole.

3. 1-[α-(biphenyl-4-yl)-butyryl]-3,5-dimethyl-pyrazole, M.P. 77° C (isopropanol), starting from α-(biphenyl-4-yl)-butyryl chloride and 3,5-dimethyl-pyrazole.

4. 1-[(4'-fluorobiphenyl-4-yl)-acetyl]-3,5-dimethyl-pyrazole, M.P. 73°–74° C (isopropanol), starting from (4'-fluorobiphenyl-4-acetyl chloride and 3,5-dimethyl-pyrazole.

5. 1-[α-(4'-fluorobiphenyl-4-yl)-propionyl]-3,5-dimethyl-pyrazole, M.P. 59°–61° C (isopropanol), starting from α-(4'-fluorobiphenyl-4yl)-propionyl chloride and 3,5-dimethyl-pyrazole.

6. 1-[α-(biphenyl-4-yl)-butyryl]-pyrazole, M.P. 117° C (isopropanol), starting from α-(biphenyl-4-yl)-butyryl chloride and pyrazole.

7. 1-(biphenyl-4-yl-acetyl)-3,5 diethyl-pyrazole, starting from biphenyl-4-yl-acetyl chloride and 3,5-diethyl-pyrazole.

8. 1-[(2'-chlorobiphenyl-4-yl) acetyl]-3-ethyl-pyrazole, starting from (2'-chlorobiphenyl-4-yl)-acetyl chloride and 3-ethyl-pyrazole.

9. 1-[α-(biphenyl-4-yl)-acryloyl]-pyrazole, starting from α-(biphenyl-4-yl)-acryloyl chloride and pyrazole.

The compounds of the present invention possess valuable pharmacological and therapeutic properties, especially analgesic and anti-inflammatory properties in general and topical use.

Their toxicity was studied in mice by oral route and the $LD_{50}$ was found being in all cases superior to 2,000 mg/Kg.

The anti-inflammatory activity of the new compounds was evidenced by several methods, such as described by C.A. Winter et al. (Proc. Soc. Exp. Biol. Med. 3, 544, 1962) or J. Hillebrecht (Arz. Fschg. 4, 607, 1954) on the plantar oedema of the rat's paw induced by carrageenin or by Kaolin, further by the cotton pellet test of R. Meier et al. (Experientia, 6, 469, 1950) and by the erythema induced by ultraviolet rays. In the carrageenin test the oedema was decreased from 24 to 82 percent by doses of 5 to 20 mg/Kg P.O. of the new compounds. The Kaolin-oedema was inhibited up to 62 percent with a treatment of 40 to 70 mg/Kg P.O. during three days. These results show the superiority of the new compounds in comparison with the well-known anti-inflammatory agents such as, phenylbutazone, niflumic and mefenamic acid.

Analgesic properties of the new compounds were observed by the hot plate method of Woolf G. and MacDonald A.D. modified by E. Adami et E. Marazzi (Arch. Int Pharmacodyn. 107, 322, 1956). With 100 mg/Kg of the new compounds an increase of 22 to 60 percent of the pain perception threshold could be noted.

The compounds of the present invention are useful in the treatment of inflammatory conditions, particularly in rheumatic and dermatological diseases.

The present invention further provides pharmaceutical preparations, containing a compound of general formula I in admixture or conjunction with a pharmaceutically suitable carrier such, for example, as distilled water, glucose, lactose, talc, starch, lanolin, cocoa-butter etc. The pharmaceutical forms may be tablets, capsules, suppositories, ointments or solutions for oral, rectal, topical or parenteral administration at doses of 50 to 500 mg, preferably 200–300 mg, one to five times a day.

What we claim is

1. A pyrazole compound of the formula

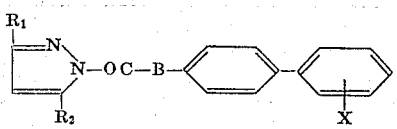

wherein:
$R_1$ and $R_2$, which are the same or different, are selected from the group consisting of hydrogen, methyl and ethyl;

B is selected from the group consisting of:

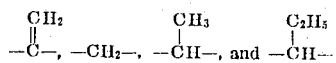

and

X is selected from the group consisting of hydrogen and halogen.

2. A compound of claim 1 which is 1-(biphenyl-4-yl-acetyl)-3,5-dimethyl pyrazole.

3. A compound of claim 1 which is 1-[α-(4'-fluorobiphenyl-4-yl)-propionyl]-3,5 dimethyl-pyrazole.

4. A compound of claim 1 which is 1-[α-(biphenyl-4-yl)-butyryl]-pyrazole.

* * * * *